United States Patent
Norbeck et al.

[11] 3,780,532
[45] Dec. 25, 1973

[54] TEMPERATURE CONTROL SYSTEM FOR CENTRIFUGAL LIQUID CHILLING MACHINES

[75] Inventors: Dean K. Norbeck; Francis A. Kimpel, both of York, Pa.

[73] Assignee: Borg-Warner Corporation, Chicago, Ill.

[22] Filed: Sept. 17, 1971

[21] Appl. No.: 181,507

[52] U.S. Cl.......... 62/201, 62/209, 62/226, 62/228, 73/362 AR
[51] Int. Cl............................ F25b 1/00
[58] Field of Search.............. 62/217, 226, 227, 62/228, 230, 129, 125, 98, 209, 210, 211, 62/212, 214, 201; 73/342, 362

[56] References Cited
UNITED STATES PATENTS

| | | | |
|---|---|---|---|
| 2,577,903 | 12/1951 | McGrath | 62/214 |
| 2,577,902 | 12/1951 | McGrath | 62/212 |
| 3,633,073 | 1/1972 | Day, Hill, Kimpel | 317/38 |
| 3,625,020 | 12/1971 | Day, Kimpel, Fleckenstein | 62/158 |
| 3,585,451 | 6/1971 | Day | 317/13 |
| 3,369,750 | 2/1968 | Davis | 236/68 |
| 3,290,940 | 12/1966 | Hines | 73/341 |
| 3,204,423 | 9/1965 | Resh, Jr. | 62/215 |

Primary Examiner—William F. O'Dea
Assistant Examiner—Paul Devinsky
Attorney—Donald W. Banner et al.

[57] ABSTRACT

An improved temperature control system for centrifugal compressors in refrigeration equipment for elimination of "droop" associated with proportional position control is disclosed using a two thermistor temperature sensing unit for sensing both the temperature and the rate and direction of change of the temperature of the chilled liquid from the evaporator and for producing a change in the pre-rotation vane setting. The rate and direction of change of temperature is obtained by comparing a fast and a slow temperature signal in a summing amplifier to control a pulse width modulator that modulates a sawtooth generator to control a vane motor through appropriate logic. The fast temperature signal is also compared with a unit cycling thermostat reference signal in a Schmitt Trigger to de-energize the compressor when that temperature signal reaches the reference level. The fast temperature signal is also used to drive a recorder.

9 Claims, 6 Drawing Figures

TEMPERATURE CONTROL SYSTEM FOR CENTRIFUGAL LIQUID CHILLING MACHINES

The present invention is directed to refrigeration equipment control systems and is specifically directed to an improved temperature control system for centrifugal liquid chilling machines.

BACKGROUND OF THE INVENTION

The present system constitutes an improvement in refrigeration control systems and is complimentary with the system disclosed in pending U.S. application Ser. No. 882,792, filed Dec. 5, 1969 in the names of A. R. Day and F. A. Kimpel (one of the present inventors), entitled "Overload and Overcurrent Regulation and Protection System" and assigned to the same assignee, Borg-Warner Corporation, as the present invention. That application which has now issued, on Jan. 4, 1972, as U.S. Pat. No. 3,633,073, sets out the general background of this technical area.

It is also known to use a positive thermistor and negative thermistor having different time delays in reacting to changes in chilled water temperature connected in series as part of an a.c. bridge circuit with phase detectors to determine the direction of temperature change as shown in U.S. Pat. No. 3,204,423 issued in the name of R. E. Resh, Jr.

SUMMARY OF THE INVENTION

In accordance with the present invention, a temperature control system is provided for controlling centrifugal liquid chilling machine operation which senses leaving liquid temperature with two sensing devices having different time constants from which two electrically independent signals are derived. A combination of these signals with a desired temperature signal (called a set point reference) yields a signal proportional to leaving liquid temperature deviation from the set point plus rate and direction of changing leaving liquid temperature. This signal is employed to govern the energizing of refrigerent throttling means such as prerotation vanes depending upon corrective action required. The result is a stable control system which returns to and maintains leaving liquid temperature at the set point temperature, thus eliminating "droop."

Another feature of this invention is the incorporation of a unit cycling thermostat to interrupt the controller when the leaving liquid temperature reaches a preselected limit value. This feature has economic advantages as well as better coordination between set point temperature and limit temperature.

An additional feature and advantage of the present invention lies in the ease of accommodation of both such droop elimination and temperature recording using the same sensor unit.

In accordance with one feature of the present invention an improved temperature sensor is provided which comprises a first and second thermal sensitive element, of similar electrical characteristics which are mounted in a housing adapted for insertion into the chilled liquid leaving line. The sensors are provided with different thermal insulation so that the first is insulated from the chilled liquid to a greater degree than the second. Electrical conductive lines are coupled to the elements in the housing and extend without the housing to allow independent electrical signals to be developed from each of the similar elements. This allows both a rate of change control function, which function uses both elements, and one or more independent functions (such as temperature recording or unit cycling), which use only one element, may be employed at one and the same time.

The invention, together with the further advantages thereof, may best be understood by reference to the following description taken in connection with the accompanying drawings, in the several figures of which like reference numerals identify like elements.

DETAILED DESCRIPTION

Figures 1, 2:
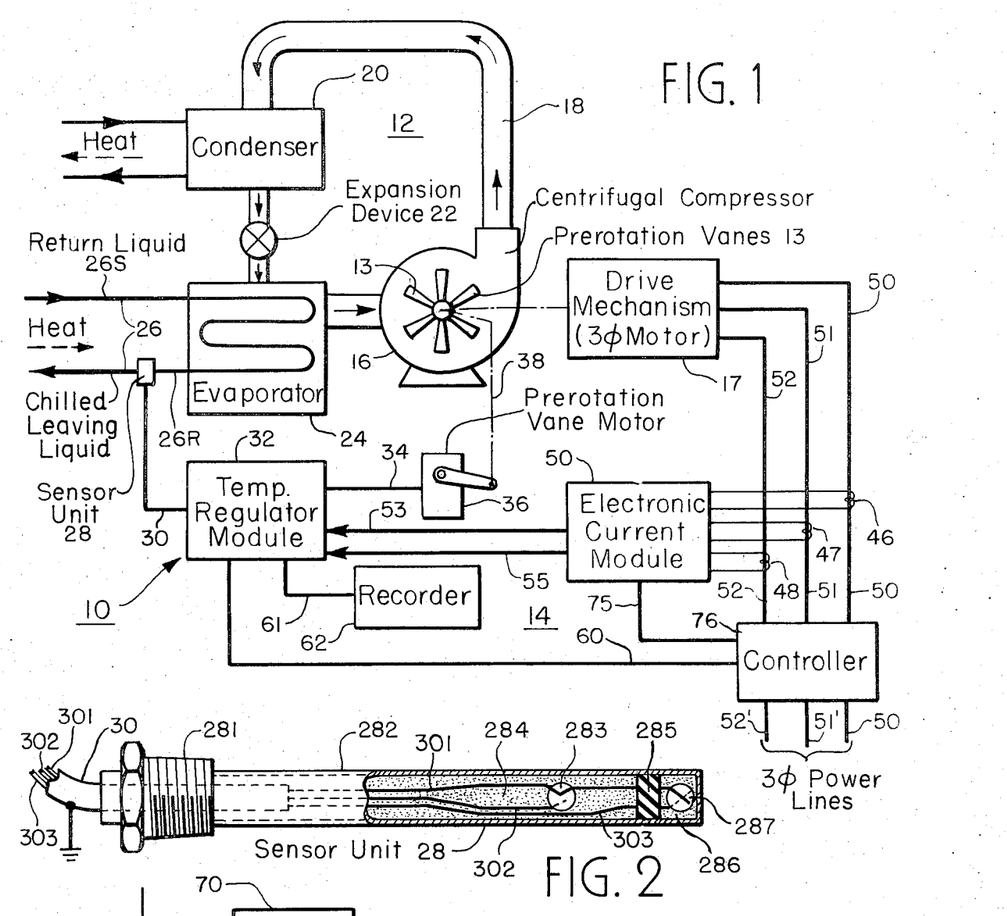
FIG. 1 is a block diagram of a temperature control system constructed in accordance with the principles of the present invention as employed with a refrigeration system.
FIG. 2 is a side view, with parts broken away to show interior parts, of the sensor unit of the system of FIG. 1.

Referring to FIG. 1 there is depicted a refrigeration system including its control and a motor overload protection system constructed in accordance with the present invention. The overall refrigeration system is generally designated by the numeral 12. The refrigeration system 12 is of the large capacity type such as might be employed in air conditioning a large building and employs the vapor-compression refrigeration cycle.

In such vapor-compression cycle equipment it is conventional to employ a closed loop processing of a refrigerant such as freon. The refrigerant is continuously processed in a closed loop operation wherein it is compressed, liquefied to give up heat at one stage, collected, then evaporated to take on heat at another stage, and finally recompressed again.

In achieving this cycle the system 12 employs a centrifugal compressor 16 which compresses the refrigerant and from which the compressed refrigerant is fed via a line 18 to a condenser unit 20. The condenser 20 often includes a water conductive heat exchanger to facilitate the removal of heat therefrom. From the condenser 20 the now-liquid refrigerant is received and collected in a receiver and controllably delivered therefrom to an evaporator 24 through expansion device 22. In the evaporator 24 the refrigerant is again changed to a gaseous state thereby absorbing heat. A heat exchanger often employing a liquid such as water as a medium is provided in the evaporator 24. This heat exchanger has water lines 26, one the return liquid line 26S, for receiving liquid and another, the line 26R, for supplying cooled liquid to units such as individual room heat exchangers for eventually cooling the air of rooms in a building.

From the evaporator 24 the gaseous refrigerant is continuously returned for re-cycling to the compressor 16. The primary motive power for the system 12 is supplied by a drive mechanism, e.g., three-phase electric motor 17 which is mechanically coupled to the compressor 16 as signified by the dashed line therebetween.

The motor 17 is of a large capacity type and is fed from three-phase power lines 50, 51, 52 which are connected to the coils of the motor 17 through various conventional switching which includes a set of controlled-in-common switch contacts of a controller 76 for interrupting current. Normally, the motor 17 draws current and power from the lines 50, 51, 52 in proportion to the mechanical load placed upon it by the compressor 16. The effective load of the compressor 16 is variable by throttling means such as internal pre-rotational vanes 13. Such vanes serve to modify the mechanical opening and alter the nature of the flow of refrigerant to the compressor and to thereby change the mechanical loading that the compressor places upon the motor.

This load varying throttling means 13 is conventionally operated by a vane control motor 36. The vane motor 36, which is of a much smaller size than that of the prime mover motor 17 is, in turn, controlled and powered by an electronic temperature regulator module 32. During normal operation, the compressor load is controlled by the temperature module 32 to maintain the desired cooled liquid temperature leaving from the liquid leaving line 26R of the lines 26. The cooled liquid temperature is sensed by a temperature sensor unit 28 which provides a temperature representative control signal to the temperature regulator 32. The sensor unit and temperature regulator module 32 form part of a unique temperature control system, generally designated by the numeral 10, constructed in accordance with the present invention.

As thus far described, the system during normal operation functions to regulate the operation of the refrigeration equipment to achieve a desired temperature output in a novel manner as will be explained in more detail later. To provide for overcurrent situations an electronic current module 50 may be provided as part of the system 12. This module may be the same as that taught in the aforementioned U.S. Pat. No. 3,633,073.

The module 50 monitors the current fed to the motor by means of three coils 46, 47, 48 each of which is in transformer relationship with a different phase line 50, 51, 52 of the motor 17. Within each coil 46, 47 or 48 is developed a current signal proportional to the current drawn by the corresponding phase line. In response to these the module 50 may override the electronic temperature module 32 and change (over lines 53, 55) the loading via the vane motor 38 or disconnect the lines 50–52 via the line 75 and the controller 76.

Also depicted in FIG. 1 in accordance with features of the present invention is a recorder 62 coupled as indicated by the line 61 to the electronic temperature module 32 for recording certain temperature signals and a second control line 60 to the controller 76 which forms part of a unit cycling control.

The sensor unit 28 which forms part of the inventive system 10, is shown in detail in FIG. 2. Referring to that figure it can be seen that the unit 28 includes a thin thermally conductive tubular housing 282 which is secured into the chilled liquid return line 26R by means of a leak-proof coupling 281 so as to be directly exposed to the liquid and to sense and respond to its temperature. Although here shown as a leak proof coupling the sensor unit 28 may be inserted in the line 26R in other ways, e.g. by means of a standpipe or "well."

The line 30 is a three conductor cable having a grounded shield for signal isolation. The three conductors serve as a reference regulated voltage, line 301, slow signal output line 302 and fast signal output line 303. Within the tube 282 there are two temperature sensors 283 and 287 which are preferably thermistors - temperature sensitive resistors. These are connected respectively from the line 301 to the line 302 and from the line 301 to the line 303. The thermistors 283 and 287 are preferably nagative temperature coefficient thermistors - that is they are ones whose resistance declines with increased temperature.

The thermistor 287 is embedded in an epoxy body 286. The epoxy of the body 286 is preferably of a good thermal conductivity type such as EPO-TEK 921-FL manufactured by Epoxy Technology Company. The thermistor 283 is also embedded in an epoxy body 284. Epoxy body 284 is an epoxy with less thermal conductivity than body 286. This, as well as different geometry and construction, make it respond slower than the termistor 287. A suitable material for the body 284 is the currently commercially available: A-4 "METALSET" Brand epoxy made by Smooth-on Manufacturing Company. Between the bodies 286 and 284 is a thermal isolator, preferably a rubber disc 285.

The two thermistors 284 and 286 are of the same type and preferably have the same characteristics. A suitable example is type KB23L2 (Fenwal Electronics, Inc.). The geometry and construction of the sensor unit 28 are designed to provide the sensor 287 with a fast response and sensor 283 with a slow response.

With a slow temperature change both sensor 283 and 286 will track together and will provide a signal proportional to the liquid temperature.

With a fast change in temperature the temperature of sensor 283 will lag behind the temperature of sensor 287 and a difference between the two will exist which is generally proportional to the rate of the temperature change. In accordance with the present invention, this difference is detected by the electronic module 32 which adds it to the difference between control point and actual liquid temperature. This effectively shifts the control point up during temperature decreases and down during temperature increases.

Figure 3:
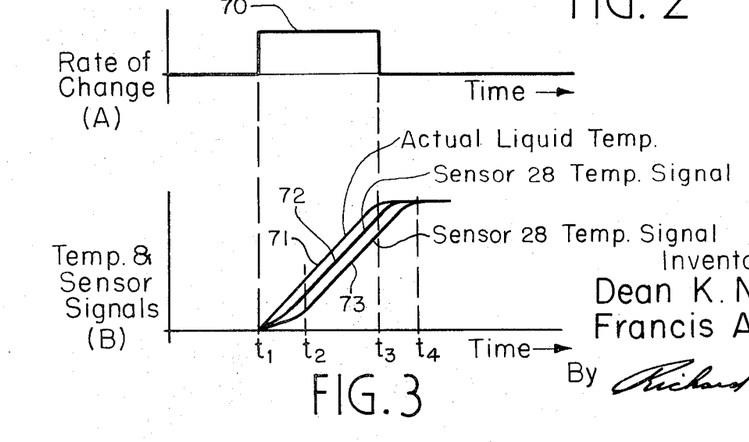
FIG. 3 is a graphical chart where GRAPH (A) represents the rate of change of temperature versus time and GRAPH (B) represents the relative sensed temperature of various parts of the sensor unit of FIG. 1 and the actual liquid temperature.

Referring to FIG. 3 the rate measuring ability of sensor unit 28 is there depicted GRAPH (A) depicts the rate of change of temperature plotted on a time base. GRAPH (B) depicts the temperature of sensors 283 and 287 and liquid temperature plotted on the same time base. With zero rate of change, the temperatures of sensors 283 and 287 are identical since they are exposed to a fixed temperature for a relatively long time. At time $t_1$ a positive step in rate of temperature change is made. This causes the liquid temperature to rise in a straight line function as shown in GRAPH (B). The temperatures of sensors 283 and 287 lag behind the liquid temperature as shown. The difference between sensor 283 and 287 is small at first but quickly increases reaching its maximum constant value at $t_2$. Since the rate of change is constant during this period, it is evident that there is a delay, from $t_1$ to $t_2$, in obtaining the full magnitude of the difference in sensor temperatures. This rate signal will lag behind the actual rate when the rate changes. It is also evident that this lag occurs from $t_3$ to $t_4$ when the rate changes back to zero.

A mathematical proof that the signal difference between sensor 283 and sensor 287 is proportional to the rate is as follows:

vo1 is the signal from sensor 287
vo2 is the signal from sensor 283
$\alpha$ is the rate of temperature change
$\tau 1$ is the thermal-electric time constant of sensor 287
$\tau 2$ is the thermal-electric time constant of sensor 283
$t$ is time
T is liquid temperature
then:

$$vo1 = \alpha(t-\tau 1) + \alpha\tau 1 e^{-t/\tau 1} \quad (1)$$

and $$vo2 = \alpha(t-\tau 2) + \alpha\tau 2 e^{-t/\tau 2} \quad (2)$$

Figure 4:
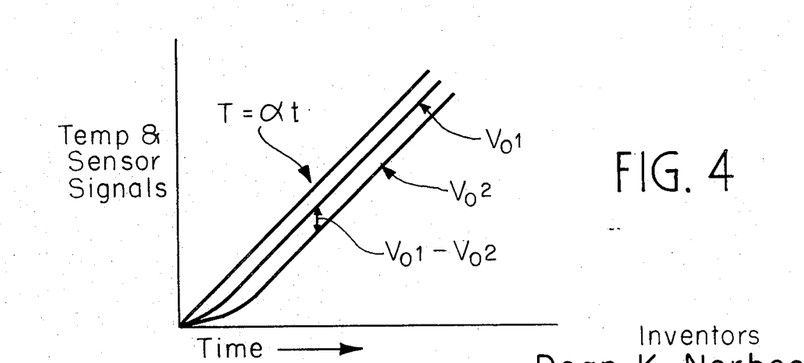
FIG. 4 is a graphical chart similar to that of FIG. 3.

The above two equations (shown graphically in FIG. 4) are taken from *Pulse, Digital, and Switching Waveforms* by Millman and Taub, McGraw-Hill Book Company, New York, 1965, P. 48. They have been converted from electrical expressions to thermal-electric expressions by replacing the electrical time constant RC with $\tau 1$ and $\tau 2$.

$$vo1 - vo2 = \alpha t - \alpha\tau 1 + \alpha\tau 1 e^{-t/\tau 1} - \alpha t + \alpha\tau 2 - \alpha\tau 2 e^{-t/\tau 1} \quad (3)$$

and $$vo1 - vo2 = -\alpha\tau 1 + \alpha\tau 1 e^{-t/\tau 1} + \alpha\tau 2 - \alpha\tau 2 e^{-t/\tau 2} \quad (4)$$

if $t$ is very large relative to $\tau 1$ and $t$ is very large relative to $\tau 2$, then:

$$vo1 - vo2 \approx -\alpha\tau 1 + \alpha\tau 2 = \alpha(\tau 2 - \tau 1) \quad (5)$$

Since $\alpha$ is rate and $\tau 2$ and $\tau 1$ are constants, vo1 − vo2 is proportional to rate when $t$ is large with respect to $\tau 1$ and $\tau 2$.

Figure 5:
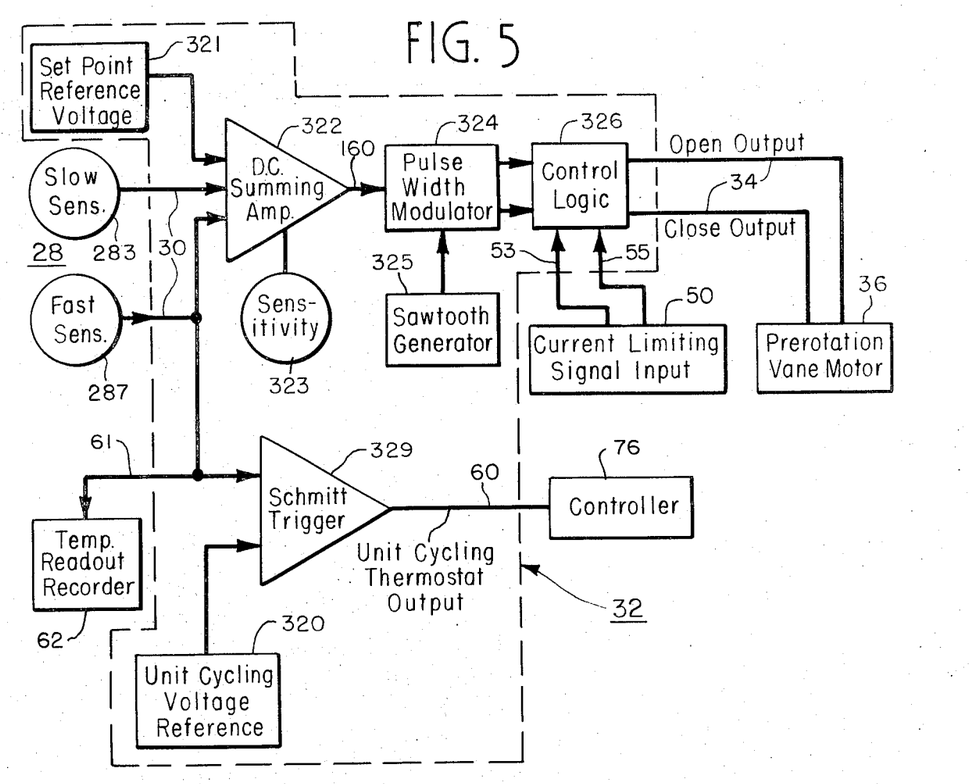
FIG. 5 is a block diagram of the inventive system.

The function of the sensing section of the temperature module 32 is, as better shown in FIG. 5, to detect the temperature difference in sensed temperatures of the two sensors, and combine this information to provide a signal which is proportional to the temperature, compared to the control point, plus the rate of change of the temperature. To this end the module 32 includes a d.c. Summing Amplifier 322 having three signal inputs, one from a set point reference signal source 321 and the others from the slow temperature sensor signal source 283' and the fast temperature sensor signal source 287' as indicated by the lines 30''. In the d.c. summing amplifier 322 the slow temperature sensor 283 signal is compared to the fast temperature sensor 287 signal. The control point reference 321 is compared to the fast temperature sensor 287 signal. The differences are combined and amplified to provide a signal proportional to liquid temperature shift from the control point plus the rate and direction of change of liquid temperature. A sensitivity control 323 is incorporated to change the gain of the summing amplifier 322 to stabilize each control and refrigeration system.

The output of the summing amplifier 322 is fed to a pulse width modulator 324 where a pulse width output is produced employing a sawtooth generator 325. The operation and construction of this modulator 324 and sawtooth wave generator 325 (which form part of a system for controlling the pre-rotation vane motor 36) are described and claimed in copending U.S. Pat. application Ser. No. 181,407, entitled "Refrigeration System PRV Motor Control System," on the same date, Sept. 17, 1971, herewith in the name of the present inventor, Dean K. Norbeck and assigned to the same assignee, Borg-Warner Corporation, as the present application. For brevity, the description and drawings of that application are hereby incorporated by reference as is fully set out herein, under the practice summarized by the Commissioner of Patents in 34 *Federal Register* 833 on Jan. 18, 1969 (859 *Official Gazette* 346).

The pulse width modulator 324 provides pulses of varying width, with a constant period, to either the open or close section of the control logic 326 as necessary. The pulse width is proportional to the amount of opening or closing of the pre-rotation vanes required.

A pulse reaching the control logic 326 from the pulse width modulator 324 to open the vanes will send a signal to the open output line of the lines 34 unless an inhibit signal is present from the current limiting signal input unit 50. If no inhibit signal is present the pre-rotation vane motor 36 will move to open the vanes. A pulse from the pulse width modulator 324 or a signal from the current limiting signal input 50 reaching the control logic 326 to close the vanes, will send a signal to the close output of the lines 34 and move the pre-rotation vane motor 36 to close the vanes. The pulse width modulator regulates the speed that the corrective action is taken. If a small correction is needed, the correction will be slow. If a large correction is needed, the correction will be fast.

A unit cycling thermostat control function is incorporated into the system 10 as part of the module 32. To this end a unit cycling reference voltage source 320 is provided. Liquid temperature is sensed with the fast temperature sensor 287 and a signal developed from the source 287' which signal is proportional to the sensed leaving liquid temperature. When this temperature reaches a level predetermined by the thermostat reference source 320, a Schmitt Trigger circuit 329 fires sending a unit cycling thermostat output signal over the line 60 to the controller 76 to operate the controller and disconnect power from the drive mechanism of the refrigeration system.

A temperature readout recorder 62 is provided coupled over the line 61 to a signal developed by the fast temperature sensor source 287' which signal is proportional to the liquid temperature. A suitable temperature readout recorder is Model 288 of the Rustrak Instrument Division of Gulton Ind. Inc. The purpose of a readout recorder is mainly to give the user a record of what the liquid temperature is or was over a period of time. This is particularly important in process applications of the system wherein the liquid temperature is critical.

In the present circuit the indicator is accurate and its cost is low. If a separate recorder were to be fitted to the system, an additional sensor would need to be installed in the chilled water line which installation can be expensive. The chief advantage with the above described system is that the same sensor can be used for both recording and for controlling the system.

Figure 6:
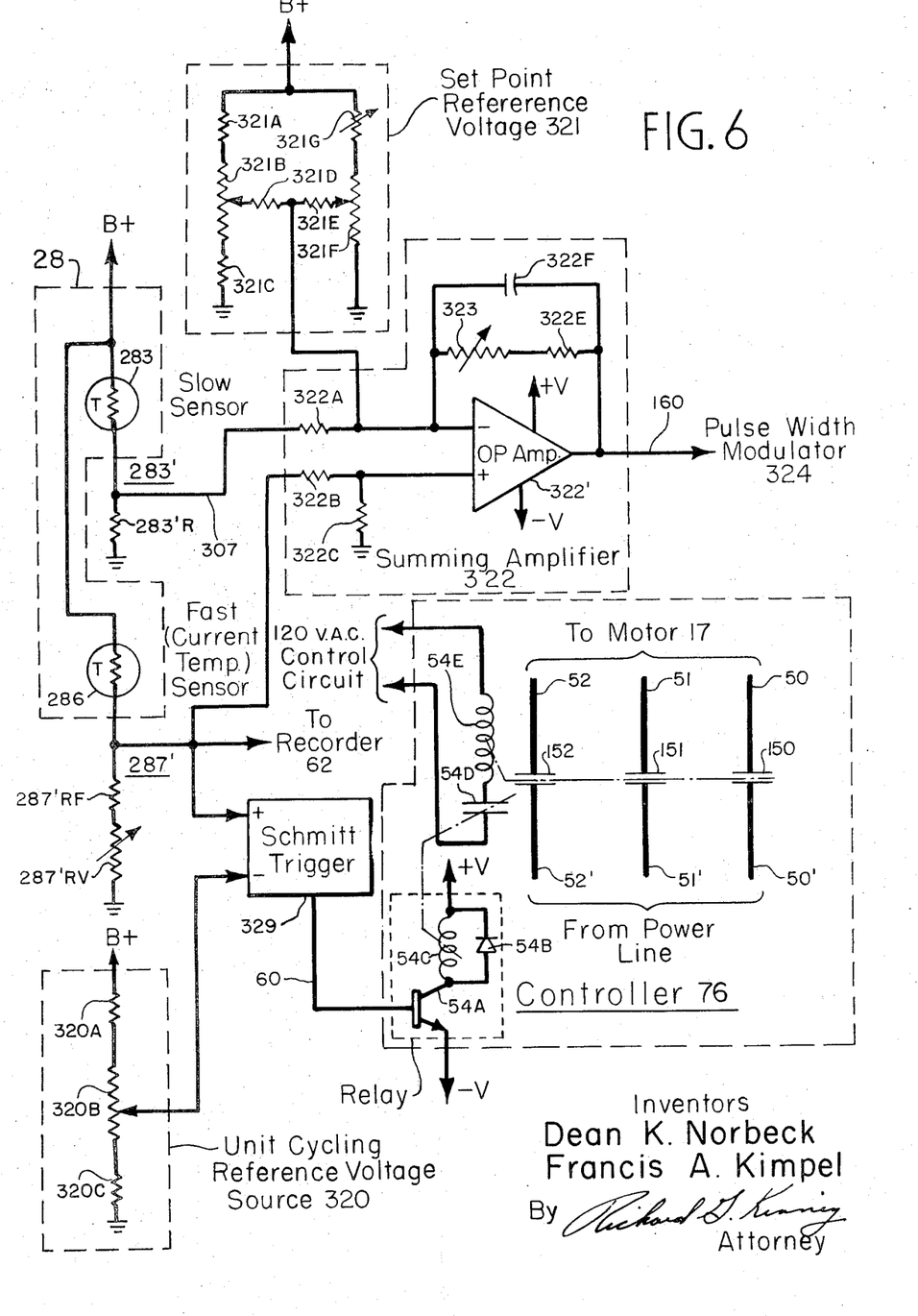
FIG. 6 is a circuit diagram of a portion of the system of FIGS. 1 and 5.

FIG. 6 shows the circuit of the sensor unit 28, Summing Amplifier 322 and Controller 76 in more detail. This represents, of course, only one particular embodiment of the invention. As can be seen in that figure the "slow" thermistor 283 is connected through a resistor 283'R to ground and the junction of that resistor serves as the input (over upper line 30') to the Summing Amplifier 322. Similarly the thermistor 286 is connected through a resistance (comprising the series connection of fixed resistor 287'RF and variable resistor 287'RV) to ground. [Of course, as used herein, "ground" may be earth potential or another plane of reference potential against which voltages are measured.]

The junction of the thermistor 286 and its connected resistance serves as the "fast" sensor signal output and the other input 30 to the Summing Amplifier 322. It also serves as the input to the recorder 62 and the positive input to the Schmitt Trigger 329. The negative input of that circuit is taken from the source 320 which, as also shown in FIG. 6, comprises three series connected resistors 320A, 320B and 320C connected between a voltage source B+ and ground. The middle resistor 320B has a manually variable tap which serves as the voltage take-off to the Schmitt Trigger 329.

The output 60 of the Schmitt Trigger 329 is either plus or minus a relatively large (e.g. 13v) d.c. potential and is connected to the base of an NPN transistor 54A which is part of the controller 76. The transistor 54A has its collector-emitter circuit connected in series with a relay coil 54C and source +V and -V and serves to energize or not energize the coil 54C in response to the output on line 60. (A conventional safety diode 54B is connected across the coil 54C.) The coil 54C functions to close contacts 54D which are in series with an a.c. relay coil 54E. The coil 54E, when de-energized opens the main power handling contacts 150, 151, 152 of respectively lines 50, 51 and 52. As described in the aforementioned Day and Kimpel application a second set of contacts (not shown in FIG. 6, for brevity) in series with contacts 54D and controlled by the current module 50 are preferably provided.

The set point reference voltage source 321 is also shown in detail in FIG. 6 and comprise a resistive network connected in two main series connected branches between B+ and ground. In one branch are resistor 321A, tapped resistor 321B and resistor 321C while in the other branch are variable resistor 321G and tapped resistor 321F. Connected between the taps of the resistors 321B and 321F is the series connection of fixed resistors 321D and 321E whose junction serves as the output of the circuit 321 and the input to the Summing Amplifier 322.

The Summing Amplifier 322 comprises Operational Amplifier 322' whose primary negative input is directly connected to the output of the voltage source 321 and through a resistor 322A to the junction of thermistor 283 and 283'R. The positive primary input of the Operational Amplifier 322' is connected to voltage dividing network comprising a resistor 322C connected to ground and a resistor 322B connected to the output of the fast sensor 287'. A feedback network between the output and primary negative input of Operational Amplifier 322' comprising a capacitor 322F connected in parallel with the series connection of a fixed resistor 322E and a variable resistor 323 (which serves as the sensitivity control 323 of FIG. 5).

In overall operation the system 10 controls the refrigeration system 12 in a manner that eliminates droop. This can best, perhaps, be understood by taking a concrete example. Suppose, as one of many possible applications, a particular air conditioning installation using the system 10, it has been determined that a chilled liquid temperature of 45°F should be maintained to keep a building adequately cooled. Consequently, the circuit 321 will be adjusted to balance out the two sensors 283', 286' in the Summing Amplifier 322 when this liquid temperature is sensed. Thus, during a stable period with a normal cooling load, the output of the Summing Amplifier will be about zero volts and consequently no output from the pulse width modulator will be present to operate the vane motor 36.

Now suppose the cooling load increases, e.g. the day becomes excessively hot. This results in a rise in the interior temperature which is soon reflected in a higher return liquid temperature. As the capacity of the compressor remains initially fixed, this causes the output or leaving liquid temperature to rise, e.g. from 45° to 48°F. This rise is soon (e.g. in about 10 seconds) sensed by the "fast" or "current" temperature sensor 286 which produces a higher voltage output. This results in an unbalanced input to the Summing Amplifier 322 and this rise in voltage is amplified and supplied to the pulse width modulator 324.

The modulator compares this voltage with negative and positive sawtooth waveforms (ranging e.g. from +1 to +13v and -1 to -13v and of fixed frequency) from the generator 325 in separate comparators and depending upon the direction (plus or minus) produces a train of pulses (13v) on one (but never both) output. The width of the pulses depends on the amplitude of the voltage received from the Summing Amplifier 322. For a low amplitude (negative or positive) only narrow pulses will be produced but for large amplitude the pulses will become wider (d.c. for a maximum amplitude).

In our particular example the sensed increased temperature results in positive voltage on the output of the d.c. Summing Amplifier and a series of pulses on the "open" vane output. Providing there is no override signal from the overcurrent module 50 this results in a series of pulses being applied over the Open Output line of lines 34 to the control circuit (e.g. a Triac) to apply intermittent a.c. power to the open winding of vane motor 36.

This opens the vanes and increases the capacity of refrigeration system 12. Of course, if the train of pulse continues it will eventually open the vanes to their maximum and the refrigeration system 12 will reach its maximum cooling capacity. However, in the normal situation the increased capacity will cool the fluid until it drops back in temperature. As this occurs, the summing or difference Amplifier 322 signal falls below the "deadband" level (below +1v) and no more pulses are produced.

It should be noted that there is no droop or allowed rise in the selected liquid temperature, but instead the system, despite a higher heating load, returns to where the chilled liquid temperature is again 45°F.

The slow temperature sensor 283' serves to prevent hunting and allows for faster and proportional response to suddenly increased or decreased loading. Suppose in our example the rise in leaving liquid temperature occurred quite quickly. Then the voltage signal of the fast or current sensor 287 indicate actual water temperature. The combination of fast and slow sensor signals provides a signal proportional to rate of change as mathematically shown above. The sum of these two signals provides a voltage at the output of amplifier 322 greater than that shown above with a constant leaving temperature higher than the selected value. Thus greater voltage provides faster and greater opening of the vanes which is necessary to return leaving temperature to the selected value without hunting.

As a second example suppose the chilled water temperature were to fall lower than the selected value: e.g. from 45° to 41°F (as might occur when the weather suddenly turns colder). When this occurs the sensors 283' and 286' react in the opposite manner producing a negative signal on the output of Amplifier 322 and a series of pulses are fed to the "close" line of the lines 34 resulting in the closing of the vanes. Should the decrease in the heat load have been minor, the system 12 is again stabilized at 45°F. However, should the decrease be quite large and the vanes be closed to the end of their range, the unit cycling thermostat comes into play. When the vanes have reached this state and capacity of the system 12 is at its minimum continuous operating capacity, but which capacity is still too much for the low heat load, the temperature of the liquid will continue to fall from the selected level until the fast sensor output reaches a triggering level for the Schmitt Trigger comparator 329. When this occurs the Controller 76 (see FIG. 6) will be operated to disconnect power from the compressor motor. This will not stop the circulation of the liquid lines 26 and after a while the temperature sensed by the sensor 287 will rise and the Schmitt Trigger 329 will reverse its output and reconnect the controller switches 150, 151, 152 to again drive the motor 17.

It should be noted that the unit cycling subsystem operates independently of the slow response sensor 283 and its output signal. This independence is a major advantage of the present inventive system in that it allows both the anti-hunting operation during throttling capacity control and unit cycling operation off of the current temperature sensor as well as a direct reading and/or recording of the sensed current temperature.

An embodiment of the invention has been constructed in accordance with FIGS. 5 and 6. This embodiment was tested and gave satisfactory performance. For completeness, this one construction will be hereafter described in detail. However, it should be noted that numerous alternative constructions may be employed in practicing the invention and, indeed, the present inventors or their assignee may well decide to make further modifications in the future and to meet different applications and environments of use. With this in mind, these components corresponding to FIG. 5, were:

Unit Cycling Reference voltage source 320 - a simple d.c. voltage divider comprising a 250 ohm potentiometer connected in series between a 332 ohm and 221 ohm resistors which series connection was connected to a 5v source and reference or ground potential.

Set point reference voltage source 321 - this circuit consists of two variable d.c. voltage dividers (similar to that of the source 320 that feed d.c. voltages into the summing amplifier 322 which together make up a signal corresponding to the desired leaving liquid temperature.

Summing Amplifier 322 - the heart of this circuit is an operational amplifier Motorola MC1741G connected in a similar configuration to that shown in the Applications Manual for Operational Amplifier by the Engineering Staff of Philbrick/Nexus Research, Nimrod Press, Boston, 1968, P. 42, Section II.5. This circuit is modified by making the feedback resistor variable and adding a parallel capacitor in the feedback path to eliminate noise. Only inputs $e1$, $e2$, $e3$ and $e4$ are used. The variable feedback resistor in the amplifier 322 changes the gain of the summing amplifier and therefore serves as the sensitivity control 323 of the circuit. The modulator 324, generator 325, control logic 326 and associated circuitry are identified in the aforementioned and incorporated by reference Norbeck patent application.

The Schmitt Trigger 320 was that shown in "Fairchild Semiconductor Linear Integrated Circuits Applications Handbook," James N. Giles, Fairchild Semiconductor, 1967, pp. 165-166. A Motorola MC1741G operational amplifier is used in this configuration. R2 of that circuit being variable (0-500 ohms) to adjust the unit cycling differential and a diode (1N914) to ground, being included in the feedback path to keep this variable differential from interfering with the set point.

The Temperature Readout Recorder 62, was Rustrak Instrument Div., Gulton Industries, Inc., Model 288, however any 0-50 d.c. microamp ammeter with a 5400 ohm coil and suitable scale may be used.

The Slow Sensor 283, Fenwall KB23L2 thermistor in series with a resistance and connected to a d.c. power supply. A d.c. voltage is developed that is proportional to temperature.

The Fast Sensor 287 was Fenwal KB23L2 thermistor in series with a resistance and connected to a d.c. power supply. The series resistance is variable to correct any tolerance errors in the thermistor. A d.c. voltage is developed that is proportional to temperature.

The voltage on line 301 is 5.0 volts d.c.

In FIG. 6 the component values not previously identified are:

| Component | Type or Value |
|---|---|
| Resistors 50B, 51B and 52B | 390 Ohms |
| Resistors 283'R | 511 Ohms |
| Resistor 287'RF | 453 Ohms |
| Resistor 287'RV | 0-250 Ohms |
| Resistor 320A | 332 Ohms |
| Resistor 320C | 221 Ohms |
| Resistors 321A and 321G | 300 Ohms |
| Resistors 321B | 250 Ohms |
| Resistor 321C | 510 Ohms |
| Resistors 321D and 321E | 22K Ohms |
| Resistor 321 F | 1K Ohms |
| Resistor 322A | 2.2K Ohms |
| Resistor 322E | 1.0M Ohms |
| Resistors 322C and 323 | 1.5M Ohms |
| Resistors 322G and 322B | 1.8K Ohms |
| Thermistors 283 and 286 | KB23L2 |
| Operational Amplifier 322' | MC1741G |
| Transistor 54A | 2N5365 |
| Diode 54B | 1N914 |
| Capacitors 50A, 51A and 52A | 3000 pF |
| Capacitor 322F | 0.1 $\mu f$ |

It should be noted that an advantage of this system was that one of the two sensors was used to record temperature and operate the unit cycling thermostat as well as serve as part of a rate of change sensor. This is not possible with sensors in series as, for example, those shown in the aforementioned U.S. Pat. No. 3,204,423.

As should now be apparent a new and improved temperature control system has been described wherein the deviation or droop associated with proportion positioning controls, has been decreased or eliminated, and other advantages are achieved.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a refrigeration system, the combination of:
   means defining a refrigerant circuit;
   a centrifugal compressor connected in the circuit for compressing refrigerant;
   an electric motor connected for driving said centrifugal compressor;
   refrigerant throttling means, coupled throttle refrigerant supplied to said compressor for reducing the load on said electric motor;
   control means for controlling said refrigerant throttling means; and
   temperature sensing and signaling means connected to produce two electrically independent signals and for operating said throttling control means in response to one and both of said independent signals;
   and wherein said sensing and signaling means produces a first d.c. signal whose voltage is proportional to sensed current output temperature as one of said independent electrical signals and a second d.c. signal whose voltage amplitude is proportional to the prior output temperature as the other of said independent electrical signals;
   said system includes a set point reference signal source which set point signal is a d.c. voltage of a preselected amplitude;
   means coupled to receive said first, second and set point signals for producing an output d.c. signal whose amplitude is a function of all three such signals; and
   means actively coupled to said aforementioned signal receiving means, for energizing said control means for said throttling means in response to said input d.c. signal thereof.

2. In a refrigeration system, the combination of:
   means defining a refrigerant circuit;
   a centrifugal compressor connected in the circuit for compressing refrigerant;
   an electric motor connected for driving said centrifugal compressor;
   refrigerant throttling means, coupled throttle refrigerant supplied to said compressor, for reducing the load on said electric motor;
   control means for controlling said refrigerant throttling means; and
   temperature sensing and signaling means connected to produce two electrically independent signals and for operating said throttling control means in response to one and both of said independent signals;
   wherein means are provided for deriving a rate of change signals from said independent temperature signals and for deriving set point deviation indicating signals and said throttling means is governed as a function of both said rate of change signals and said set point deviation signals.

3. The invention of claim 2 which also includes:
   control means (76) for interrupting the supply of electrical current to said electric motor; and
   unit cycling means (329, 320) coupled to said sensing and signaling means and to electrical interrupting controller means and responsive to the concurrent output temperature signal for causing the interruption of current to said motor in response to a current output temperature signal reaching a predetermined level and for ceasing the interruption after such signals fall below a certain level.

4. The invention of claim 3 wherein the system also includes:
   electric current module means (50) for sensing the electric current drawn by said motor and for also altering said operation of said throttling control means in response to a sensed overcurrent drawn by said motor.

5. The invention of claim 2 which also includes:
   a recorder coupled to said temperature sensing and signaling means for recording over a period of time the sensed current temperature signal therefrom.

6. In a refrigeration system of the type having a compressor, evaporator, liquid heat exchanger in the evaporator and a control system responsive to chilled liquid temperature, the improvement in a chilled liquid sensor unit (28) comprising:
   a first thermal sensitivity electric circuit element (283);
   a second thermal sensitivity electric circuit element (287) of a similar electrical characteristic to said first element;
   a housing (282) in which said first and said second elements are enclosed, said housing having means (281) adapting it for insertion into a chilled liquid leaving line;
   means for thermally insulating said first element to a relatively greater extent than said second element from the chilled liquid in such a leaving line; and
   electrical lines coupled to said first and said second elements and extending without said housing for allowing a first electrical signal to be produced representative of the temperature of said first element and a second electrical signal to be produced representative of said second element;
   whereby independent control functions, such as current liquid temperature recording using one of said elements, as well as rate of temperature change control using both of said elements, may be simultaneously employed.

7. The improvement described in claim 6, wherein:
   said first and said second thermal sensitive electric circuit elements are thermistors;
   said electric lines for producing independent signals are three:
   a first line connected to one side of each of said thermistors and a second line and third line respectively connected to the other end of one of said thermistors.

8. The invention of claim 7, wherein:
   said housing is a generally tubular shape;
   said thermistors are encased in epoxy within different portions of said tubular housing; and
   a thermal insulating wall (285) is positioned between said encased thermistors.

9. A refrigeration system comprising:
   a centrifugal refrigerant compressor having load reducing means;
   a condenser coupled to said compressor, to receive compressed refrigerant therefrom;
   an expansion device coupled to the condenser;
   an evaporator for receiving refrigerant from said expansion device and supplying it to said compressor, said eveporator having a heat exchanger employing a return liquid and leaving chilled liquid lines;

a sensor unit connected in the chilled liquid leaving line, said sensor unit having two negative temperature responsive resistors one of which is mounted to track closely with the temperature of the chilled liquid leaving and the other of which has thermal insulation between it and that liquid so as to lag in responding to changes in the temperature of that liquid;

an electronic temperature module coupled to said sensor unit for deriving an independent temperature information signal from each of said temperature responsive resistors thereof and for producing a rate of change signal therefrom and for producing a load modification signal as a function of the temperature and rate signals; and means responsive to the load modification signals of said module for altering the load reducing means of said centrifugal compressor;

whereby said system may be caused to reduce "droop."

* * * * *